United States Patent
Han et al.

(10) Patent No.: US 9,851,052 B2
(45) Date of Patent: Dec. 26, 2017

(54) METHOD AND SYSTEM FOR TREATING A LIQUEFIED GAS

(71) Applicant: HYUNDAI HEAVY INDUSTRIES CO.,LTD., Ulsan (KR)

(72) Inventors: Ju Seog Han, Dong-gu (KR); Eun Sung Baek, Jung-gu (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 671 days.

(21) Appl. No.: 14/131,675

(22) PCT Filed: May 14, 2013

(86) PCT No.: PCT/KR2013/004281
§ 371 (c)(1),
(2) Date: Jan. 8, 2014

(87) PCT Pub. No.: WO2013/172641
PCT Pub. Date: Nov. 21, 2013

(65) Prior Publication Data
US 2014/0150470 A1    Jun. 5, 2014

(30) Foreign Application Priority Data

May 14, 2012 (KR) .................. 10-2012-0051047
Dec. 14, 2012 (KR) .................. 10-2012-0146662
(Continued)

(51) Int. Cl.
*C10L 3/12* (2006.01)
*F17C 7/02* (2006.01)
(Continued)

(52) U.S. Cl.
CPC ............... *F17C 7/02* (2013.01); *F02M 21/06* (2013.01); *F17C 7/04* (2013.01); *F17C 9/00* (2013.01);
(Continued)

(58) Field of Classification Search
CPC ...... F17C 2250/0694; F17C 2250/0652; F17C 2250/0456; F17C 7/02; F17C 13/025; F17C 13/026; F02M 21/06; C10L 3/12
(Continued)

(56) References Cited

U.S. PATENT DOCUMENTS 3,864,918 A * 2/1975 Lorenz .................... B63B 25/12
                                                         60/651
4,487,025 A * 12/1984 Hamid .................... E21B 43/26
                                                         220/749
(Continued)

FOREIGN PATENT DOCUMENTS

CN        102105736       6/2011
EP         1990272       11/2008
(Continued)

OTHER PUBLICATIONS

Office Action dated Jul. 29, 2015 for Chinese Patent Application No. 201380002881.4 and its English translation by Google Translate.
(Continued)

*Primary Examiner* — Dominick L Plakkoottam
*Assistant Examiner* — Joel Attey
(74) *Attorney, Agent, or Firm* — Ladas & Parry, LLP

(57) ABSTRACT

A liquefied gas treatment system includes: a liquefied gas supply line connected from a liquefied gas storing tank to a source of demand, a pump provided on the liquefied gas supply line, and configured to pressurize liquefied gas discharged from the liquefied gas storing tank, a heat exchanger provided on the liquefied gas supply line between the source
(Continued)

of demand and the pump, and configured to heat exchange the liquefied gas supplied from the pump with heat transfer media, a media heater configured to heat the heat transfer media, a media circulation line connected from the media heater to the heat exchanger, and a controller configured to change a flow rate of the heat transfer media flowing into the media heater or calories supplied to the heat transfer media by the media heater on the basis of a flow rate of the liquefied gas supplied to the heat exchanger

12 Claims, 3 Drawing Sheets

(30) Foreign Application Priority Data

May 14, 2013 (KR) .................. 10-2013-0054603
May 14, 2013 (KR) .................. 10-2013-0054623

(51) Int. Cl.
| | |
|---|---|
| F17C 13/02 | (2006.01) |
| F02M 21/06 | (2006.01) |
| F17C 9/00 | (2006.01) |
| F17C 9/02 | (2006.01) |
| F17C 7/04 | (2006.01) |
| F28F 23/02 | (2006.01) |
| F28F 27/00 | (2006.01) |
| F28F 19/00 | (2006.01) |
| F02M 21/02 | (2006.01) |

(52) U.S. Cl.
CPC .............. *F17C 9/02* (2013.01); *F17C 13/025* (2013.01); *F17C 13/026* (2013.01); *F28F 19/006* (2013.01); *F28F 23/02* (2013.01); *F28F 27/00* (2013.01); *C10L 3/12* (2013.01); *F02M 21/0215* (2013.01); *F02M 21/0245* (2013.01); *F02M 21/0284* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2225/035* (2013.01); *F17C 2227/0135* (2013.01); *F17C 2227/0302* (2013.01); *F17C 2227/0323* (2013.01); *F17C 2250/043* (2013.01); *F17C 2250/0439* (2013.01); *F17C 2250/0456* (2013.01); *F17C 2250/0631* (2013.01); *F17C 2250/0636* (2013.01); *F17C 2250/0652* (2013.01); *F17C 2250/0694* (2013.01); *F17C 2270/0139* (2013.01); *Y02T 10/32* (2013.01)

(58) Field of Classification Search
USPC .................................. 62/50.2, 49.1
See application file for complete search history.

(56) References Cited

U.S. PATENT DOCUMENTS

| | | | | |
|---|---|---|---|---|
| 5,129,264 | A * | 7/1992 | Lorenc | F04D 15/0088 415/206 |
| 7,578,138 | B2 * | 8/2009 | Varney | G05B 13/024 62/178 |
| 8,434,325 | B2 * | 5/2013 | Martinez | F25J 3/0209 62/50.2 |
| 2004/0226521 | A1 * | 11/2004 | Kang | F23N 1/022 122/5.51 |
| 2009/0241861 | A1 | 10/2009 | Sano et al. | |
| 2011/0167824 | A1 * | 7/2011 | Mak | F17C 5/06 60/651 |
| 2011/0218683 | A1 * | 9/2011 | Ben-Yaacov | F24D 11/0228 700/278 |

FOREIGN PATENT DOCUMENTS

| | | |
|---|---|---|
| JP | H07-139370 | 5/1995 |
| JP | 8-296797 | 11/1996 |
| JP | 2002-081598 | 3/2002 |
| JP | 2002-514730 | 5/2002 |
| JP | 2002-303399 | 10/2002 |
| JP | 2004-324761 | 11/2004 |
| JP | 2009-270747 | 11/2009 |
| JP | 2011-520081 | 7/2011 |
| KR | 10-0678852 B2 | 1/2007 |
| KR | 10-0883742 B1 | 2/2009 |
| KR | 10-2009-0059763 | 6/2009 |
| KR | 10-2011-0090038 | 8/2011 |
| KR | 10-2012-0004229 | 1/2012 |
| KR | 10-2012-0007641 A | 1/2012 |
| KR | 10-2012-0023406 | 3/2012 |
| KR | 10-2012-0049199 | 5/2012 |

OTHER PUBLICATIONS

Office Action dated Jul. 15, 2013 for Korean Patent Application No. 10-2013-0054623 and its English translation provided by Applicant's foreign counsel (Issued as Korean Patent No. 10-1372733).
Notice of Allowance dated Dec. 6, 2013 for Korean Patent Application No. 10-2013-0054623 and its English translation provided by Applicant's foreign counsel (Issued as Korean Patent No. 10-1372733).
Office Action dated Apr. 21, 2015 for Japanese Patent Application No. 2014-518838 and its English translation by Google Translate.
International Search Report for PCT/KR2013/004281 dated Jul. 18, 2013 and a translation thereof.
International Preliminary Report on Patentability (Chapter I) for PCT/KR2013/004281 dated Nov. 27, 2014 and its English translation provided by WIPO.
Written Opinion of the International Searching Authority for PCT/KR2013/004281 dated Jul. 18, 2013 and its English translation provided by WIPO.
Office Action dated Apr. 4, 2017 for Japanese Patent Application No. 2014-518838 and its English translation by Google Translate.

\* cited by examiner

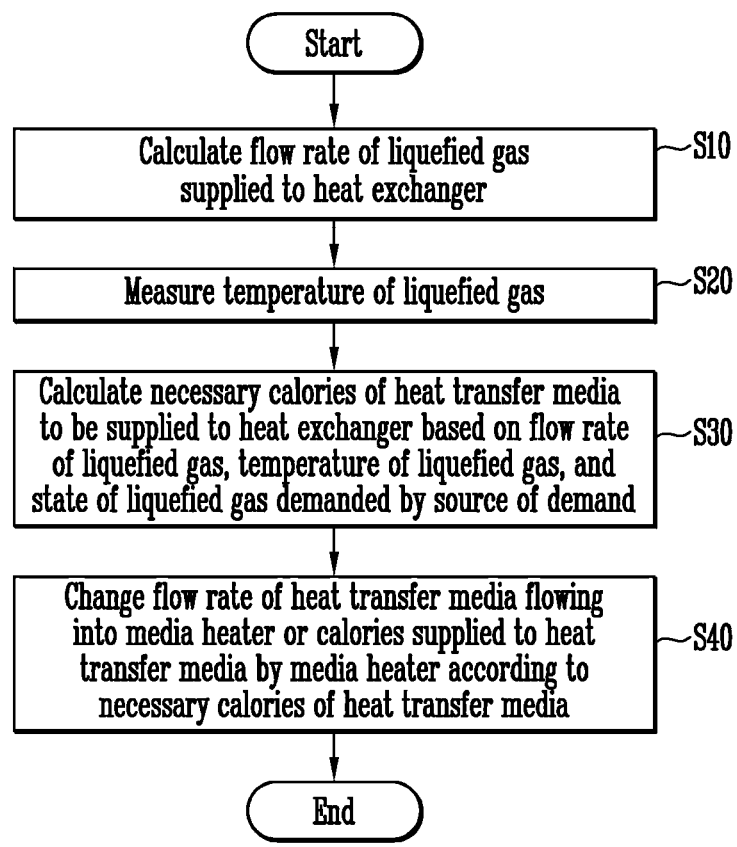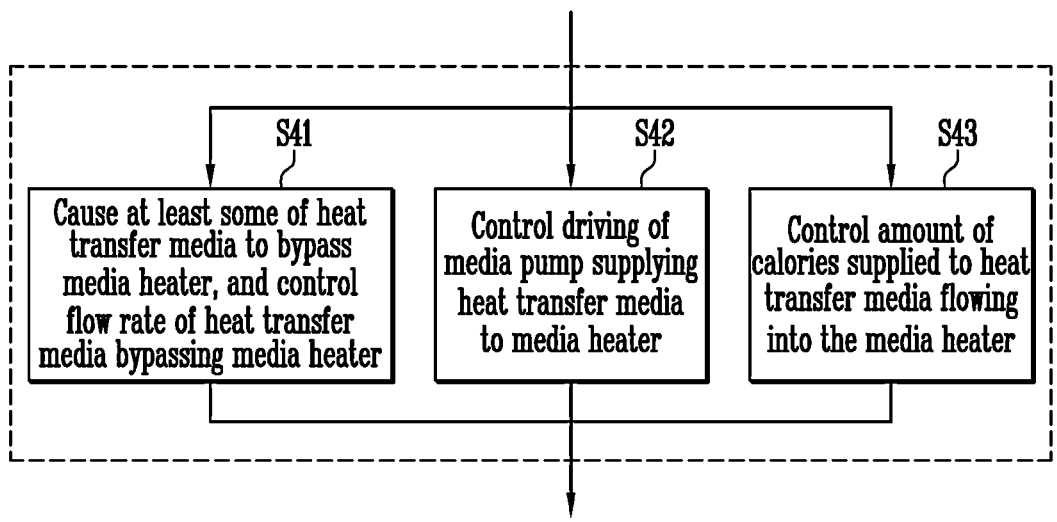

METHOD AND SYSTEM FOR TREATING A LIQUEFIED GAS

CROSS-REFERENCE TO RELATED APPLICATIONS

This application is the U.S. National Stage of International Patent Application No. PCT/KR2013/004281filed on May 14, 2013, which claims priority to Korean Patent Application No. 10-2012-0051047 filed on May 14, 2012, Korean Patent Application No. 10-2012-0146662filed on Dec. 14, 2012, Korean Patent Application No. 10-2013-0054623 filed on May 14, 2013, and Korean Patent Application No. 10-2013-0054603 filed on May 14, 2013, the disclosures of which are hereby incorporated by reference in their entireties.

TECHNICAL FIELD

The present invention relates to a liquefied gas treatment system and method.

BACKGROUND ART

Recently, with the development of technologies, liquefied gas, such as liquefied natural gas and liquefied petroleum gas, has been widely used, instead of gasoline or diesel.

Liquefied natural gas is gas obtained by cooling and liquefying methane obtained by refining natural gas collected from a gas field, and is colorless and transparent liquid, and produces few pollutants and has a high calorific value, so that the liquefied natural gas is a very excellent fuel. On the other hand, the liquefied petroleum gas is a fuel obtained by compressing and liquefying gas, of which main components are propane ($C_3H_8$) and butane ($C_4H_{10}$), collected from an oilfield, together with petroleum at room temperature. The liquefied petroleum gas is colorless and odorless, similar to liquefied natural gas, and has been widely used as fuel for home, a business, an industry, and a vehicle.

The liquefied gas is stored in a liquefied gas storing tank installed on a ground, or a liquefied gas storing tank included in a vessel, which is a transportation means sailing the ocean, and a volume of the liquefied natural gas is decreased by $1/600$ by liquefaction, and a volume of propane is decreased by $1/260$ and a volume of butane is decreased by $1/230$ by liquefaction in liquefied petroleum gas, so that storage efficiency is high.

The liquefied gas is supplied to and used in various sources of demand, and an LNG fuel supply method of driving an engine by using LNG as fuel in an LNG carrying vessel carrying liquefied natural gas has been recently developed, and the method of using LNG as the fuel of the engine has been applied to other vessels, in addition to the LNG carrying carrier.

However, a temperature, a pressure, and the like of liquefied gas demanded by a source of demand, such as an engine, may be different from a state of liquefied gas stored in a liquefied storing tank. Accordingly, in recent days, technology of supplying LNG to a source of demand by controlling a temperature, a pressure, and the like of the liquefied gas stored in a liquid state has been continuously researched and developed.

DISCLOSURE

Technical Problem

The present invention is conceived to solve the aforementioned problems, and an object of the present invention is to provide a liquefied gas treatment system and method, which calculates necessary calories by measuring a flow rate and a temperature of liquefied gas flowing in a heat exchanger and performs feed forward control of appropriately heating heat transfer media based on the calculated calories, thereby efficiently allowing the liquefied gas to meet a demanded temperature of a source of demand.

In addition, an object of the present invention is to provide a liquefied gas treatment system and method, in which some of heat transfer media bypasses a media heater based on necessary calories of liquefied gas, and a flow rate of the heat transfer media bypassing the media heater is controlled, thereby efficiently controlling a temperature of liquefied gas supplied to a source of demand.

Furthermore, an object of the present invention is to provide a liquefied gas treatment system and method, capable of easily controlling necessary calories of heat transfer media by changing an inflow rate of a media heater by controlling driving of a media pump according to calculated necessary calories of heat transfer media, or adjusting the amount of heat resources supplied from the media heater to the heat transfer media.

Technical Solution

In order to achieve the above object, the present invention provides a liquefied gas treatment system, including: a liquefied gas supply line connected from a liquefied gas storing tank to a source of demand; a pump provided on the liquefied gas supply line, and configured to pressurize liquefied gas discharged from the liquefied gas storing tank; a heat exchanger provided on the liquefied gas supply line between the source of demand and the pump, and configured to exchange heat between the liquefied gas supplied from the pump and heat transfer media; a media heater configured to heat the heat transfer media; a media circulation line connected from the media heater to the heat exchanger; and a controller configured to change a flow rate of the heat transfer media flowing into the media heater or calories supplied to the heat transfer media by the media heater on the basis of a flow rate of the liquefied gas supplied to the heat exchanger.

Specifically, the liquefied gas treatment system may further include a calorie calculator configured to calculate the flow rate of the liquefied gas supplied to the heat exchanger and calculate necessary calories of the heat transfer media on the basis of the flow rate of the liquefied gas and a state of the liquefied gas demanded by the source of demand, in which the controller may receive the necessary calories of the heat transfer media from the calorie calculator and change the flow rate of the heat transfer media flowing into the media heater or the calories supplied to the heat transfer media by the media heater.

Specifically, the calorie calculator may calculate the flow rate of the liquefied gas on the basis of a driving degree of the pump.

Specifically, the driving degree of the pump may be RPM of the pump.

Specifically, the liquefied gas treatment system may further include a liquefied gas temperature sensor provided on the liquefied gas supply line, and configured to measure a temperature of the liquefied gas, in which the calorie calculator may calculate the necessary calories of the heat transfer media by using the flow rate of the liquefied gas, the temperature of the liquefied gas, and a demanded temperature of the liquefied gas by the source of demand.

Specifically, the liquefied gas temperature sensor may be provided between the pump and the heat exchanger on the liquefied gas supply line.

Specifically, the liquefied gas treatment system may further include a branch line configured to cause at least some of the heat transfer media to be branched from the media circulation line and bypass the media heater, in which the controller may adjust a flow rate of the heat transfer media flowing into the branch line through a bypass adjusting valve provided on the branch line.

Specifically, the liquefied gas treatment system may further include: a media tank configured to store the heat transfer media; and a media pump configured to supply the heat transfer media stored in the media tank to the media heater, in which the controller may control a flow rate of the heat transfer media supplied to the media heater from the media pump by controlling driving of the media pump.

Specifically, the liquefied gas treatment system may further include: a heat source supply line configured to supply a heat source to the media heater; and a heat source supply valve provided on the heat source supply line, and configured to adjust a degree of opening of the heat source supply line, in which the controller controls the amount of heat sources supplied to the heat transfer media by the media heater by controlling the degree of opening of the heat source supply valve.

Specifically, the heat transfer media may be glycol water.

In order to achieve the above object, the present invention provides a method of driving a liquefied gas treatment system, which pressurizes liquefied gas with a pump, heats the liquefied gas with heat transfer media in a heat exchanger, and supplies the heated liquefied gas to a source of demand, in such a manner that a media heater heats the heat transfer media and supplies the heated heat transfer media to the heat exchanger, the method including: calculating a flow rate of the liquefied gas supplied to the heat exchanger; and changing a flow rate of the heat transfer media flowing into the media heater or calories supplied to the heat transfer media by the media heater on the basis of a flow rate of the liquefied gas.

Specifically, the liquefied gas treatment method may further include calculating necessary calories of the heat transfer media to be supplied to the heat exchanger on the basis of a state of the liquefied gas demanded by the source of demand, in which the changing of the flow rate of the heat transfer media or the calories supplied to the heat transfer media may include changing the flow rate of the heat transfer media flowing into the media heater or the calories supplied to the heat transfer media by the media heater according to the necessary calories of the heat transfer media.

Specifically, the calculating of the flow rate of the liquefied gas may include calculating the flow rate on the basis of a driving degree of the pump.

Specifically, the driving degree of the pump may be RPM of the pump.

Specifically, the liquefied gas treatment method may further include measuring a temperature of the liquefied gas, in which the calculating of the necessary calories includes calculating the necessary calories of the heat transfer media on the basis of the flow rate of the liquefied gas, the temperature of the liquefied gas, and the state of the liquefied gas demanded by the source of demand.

Specifically, the measuring of the temperature may include measuring the temperature of the liquefied gas between the pump and the heat exchanger.

Specifically, the changing of the flow rate of the heat transfer media may include causing at least some of the heat transfer media to bypass the media heater, in such a manner that the flow rate of the heat transfer media, bypassing the media heater, is controlled.

Specifically, the changing of the flow rate of the heat transfer media may include controlling driving of the media pump supplying the heat transfer media to the media heater.

Specifically, the changing of the calories supplied to the heat transfer media may include controlling an amount of heat sources supplied to the heat transfer media flowing into the media heater.

Advantageous Effects

According to the liquefied gas treatment system and method, feed forward control of calculating necessary calories for heating liquefied gas to a demanded temperature of the source of demand on the basis of a flow rate and a temperature of the liquefied gas before the liquefied gas flows into the heat exchanger, and controlling the heating of the heat transfer media through the calculated calories is performed, thereby efficiently increasing a temperature of the liquefied gas to the demanded temperature of the source of demand.

In addition, according to the liquefied gas treatment system and method, a temperature of liquefied gas flowing into the heat exchanger is measured by the liquefied gas temperature sensor, a flow rate of the liquefied gas is found out from RPM of the pump, and necessary calories are calculated through the flow rate and the temperature of the liquefied gas, to adjust a flow rate of the heat transfer media flowing into the media heater or the amount of heat sources supplied to the heat transfer media, thereby efficiently controlling the temperature of the liquefied gas.

DESCRIPTION OF DRAWINGS

FIG. 3 is a flowchart of a liquefied gas treatment method according to an embodiment of the present invention.

FIG. 4 is a detailed flowchart of step S40 of the liquefied gas treatment method according to the embodiment of the present invention.

BEST MODE

Hereinafter, an embodiment of the present invention will be described in detail with reference to the accompanying drawings.

Figure 1:
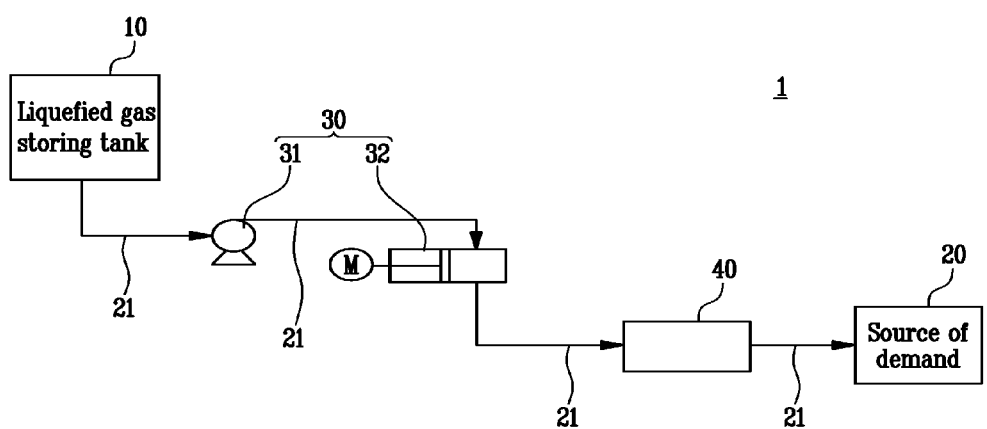
FIG. 1 is a conceptual diagram of a liquefied gas treatment system in the related art.

FIG. 1 is a conceptual diagram of a liquefied gas treatment system in the related art.

As illustrated in FIG. 1, a liquefied gas treatment system 1 in the related art includes a liquefied gas storing tank 10, a source of demand 20, a pump 30, and an electric heater 40. Hereinafter, in the present specification, liquefied gas may refer to all types of gas fuels, which are generally stored in a liquid state, such as LNG or LPG, ethylene, and ammonia, and even when liquefied gas is not in a liquid state by heating or pressurization, the liquefied gas may be expressed as liquefied gas for convenience. This is also applicable to boil-off gas.

The liquefied gas treatment system 1 in the related art heats liquefied gas at a temperature demanded by the source of demand 20 by using the electrical heater 40 when supplying the liquefied gas to the source of demand 20, such as an engine, and measures a temperature of the liquefied gas moving to the source of demand 20 from a downstream of the electric heater 40 in order to confirm whether the liquefied gas is heated to the demanded temperature of the source of demand 20.

However, in the related art, a heating amount of the electric heater 40 is changed by measuring the temperature of the liquefied gas in the downstream of the electric heater 40. Therefore, the liquefied gas at an inappropriate temperature may be supplied to the source of demand 20 to degrade efficiency of operating the source of demand 20.

Figure 2:
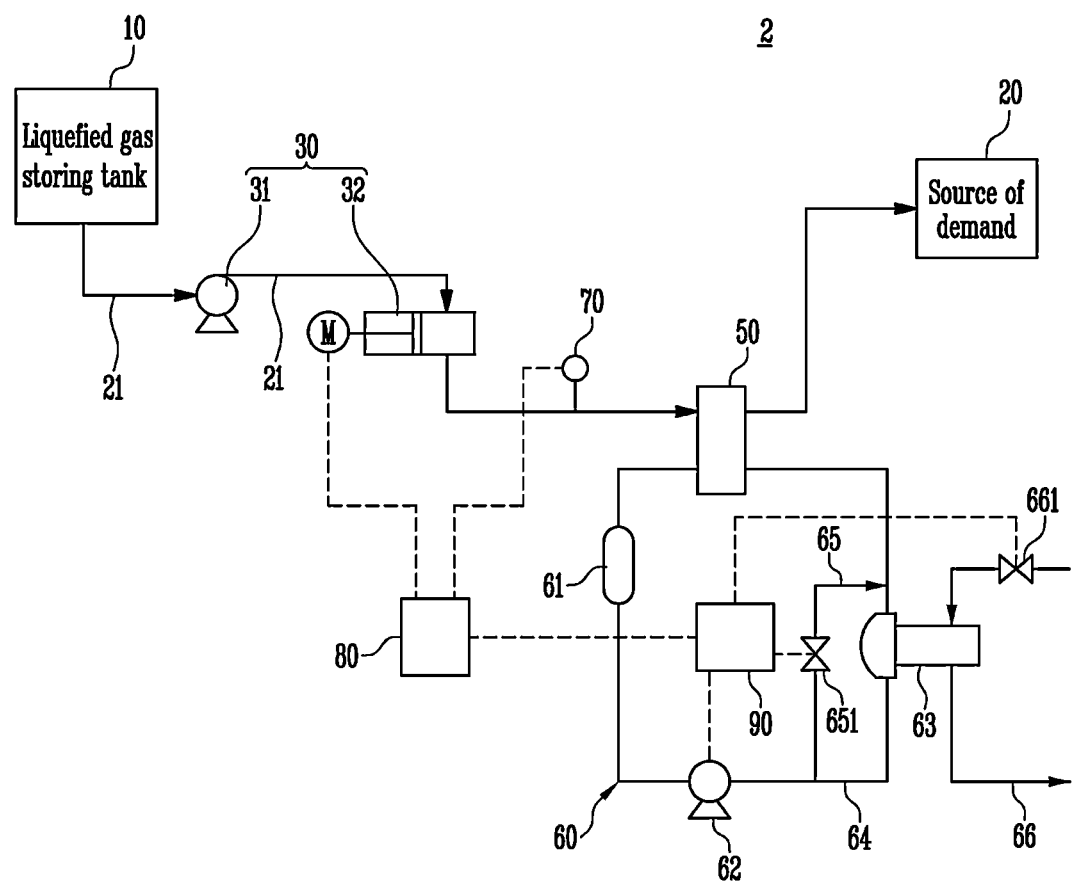
FIG. 2 is a conceptual diagram of a liquefied gas treatment system according to an embodiment of the present invention.

FIG. 2 is a conceptual diagram of a liquefied gas treatment system according to an embodiment of the present invention.

As illustrated in FIG. 2, a liquefied gas treatment system 2 according to an embodiment of the present invention includes a liquefied gas storing tank 10, a source of demand 20, a pump 30, a heat exchanger 50, a media supply device 60, a liquefied gas temperature sensor 70, a calorie calculator 80, and a controller 90. In the embodiment of the present invention, the liquefied gas storing tank 10, the source of demand 20, the pump 30, and the like are denoted by the same reference numerals as those of the respective elements of the liquefied gas treatment system 1 in the related art for convenience, but do not necessarily designate the same elements.

The liquefied gas storing tank 10 stores liquefied gas to be supplied to the source of demand 20. The liquefied storing tank 10 needs to store the liquefied gas in a liquid state, and in this case, the liquefied gas storing tank 10 may have a form of a pressure tank.

The liquefied gas storing tank 10 includes an external tank (not shown), an internal tank (not shown), and an insulation part. The external tank, which has a structure forming an outer wall of the liquefied gas storing tank 10, may be formed of steel, and may have a cross section shaped like a polygon.

The internal tank is provided inside the external tank and may be installed to be supported inside the external tank by a support (not shown). In this case, the support may be provided at a lower end of the internal tank and may be provided at a side surface of the internal tank in order to prevent the internal tank from moving in a horizontal direction.

The internal tank may be formed of stainless steel, and may be designed so as to endure a pressure of 5 bars to 10 bars (for example, 6 bars). The internal tank is designed so as to endure the predetermined pressure as described above since an internal pressure of the internal tank may be increased by evaporation of the liquefied gas contained inside the internal tank and generation of boil-off gas.

The internal tank may has a baffle (not shown) therein. The baffle means a lattice-type plate, and when the baffle is installed, the pressure inside the internal tank is evenly distributed, thereby preventing a part of the internal tank from intensively receiving the pressure.

The insulation part may be provided between the internal tank and the external tank and may block external heat energy from being transferred to the internal tank. In this case, the insulation part may be in a vacuum state. When the insulation part is formed to be in the vacuum state, the liquefied gas storing tank 10 may more efficiently endure a high pressure compared to a general tank. For example, the liquefied gas storing tank 10 may endure a pressure of 5 bars to 20 bars through the vacuum insulation part.

As described above, in the present embodiment, the pressure tank-type liquefied gas storing tank 10 including the vacuum-type insulation part, which is provided between the external tank and the internal tank, is used, so that it is possible to minimize generation of boil-off gas, and it is possible to prevent an occurrence of a problem, such as damage to the liquefied gas storing tank 10, even though the internal pressure is increased.

The source of demand 20 receives the liquefied gas from the liquefied gas storing tank 10. The source of demand 20 may be an engine driven through the liquefied gas to generate power, and for example, an MEGI engine or a dual fuel engine mounted in a vessel.

In a case where the source of demand 20 is a dual fuel engine, LNG, which is liquefied gas, is not mixed with oil to be supplied, but LNG or oil may be selectively supplied. Deterioration of efficiency of the engine may be prevented by preventing two materials having different combustion temperatures from being mixed and supplied.

In the engine, a piston (not shown) inside a cylinder (not shown) reciprocates by the combustion of the liquefied gas, so that a crank shaft (not shown) connected to the piston may be rotated, and a shaft (not shown) connected to the crank shaft may be rotated. Accordingly, when the engine is driven, a propeller (not shown) connected to the shaft is finally rotated, so that a ship body moves forward or backward.

In the present embodiment, the engine, which is the source of demand 20, may be an engine for driving the propeller. However, the engine may be an engine for generating electricity or other engines for generating power as a matter of course. In other words, in the present embodiment, the type of engine is not particularly limited. However, the engine may be an internal combustion engine for generating driving power by combustion of the liquefied gas.

A liquefied gas supply line 21 for transferring the liquefied gas may be installed between the liquefied gas storing tank 10 and the source of demand 20, and the pump 30, the heat exchanger 50, and the like may be provided in the liquefied gas supply line 21, so that the liquefied gas may be supplied to the source of demand 20.

In this case, a liquefied gas supply valve (not shown) may be installed in the liquefied gas supply line 21, so that the amount of liquefied gas supplied may be adjusted according to a level of opening of the liquefied gas supply valve.

In addition, the liquefied gas temperature sensor 70 is provided in the liquefied gas supply line 21, so that necessary calories of a heat transfer media supplying heat to the liquefied gas are detected according to a temperature of the liquefied gas and thus the temperature of the heat transfer media, which is heated through a media heater 63, may be appropriately changed. This will be described below.

The pump 30 is provided on the liquefied gas supply line 21, and pressurizes the liquefied gas discharged from the liquefied gas storing tank 10. The pump 30 may include a boosting pump 31 and a high pressure pump 32.

The boosting pump 31 may be provided on the liquefied gas supply line 21 between the liquefied gas storing tank 10 and the high pressure pump 32 or inside the liquefied gas storing tank 10. The boosting pump 31 may supply the sufficient amount of liquefied gas to the high pressure pump 32 to prevent cavitation of the high pressure pump 32. In addition, the boosting pump 31 may take out the liquefied gas from the liquefied gas storing tank 10 and pressurize the liquefied gas to several to several tens of bars, and the liquefied gas passing through the boosting pump 31 may be pressurized to 1 bar to 25 bars.

The liquefied gas stored in the liquefied gas storing tank 10 is in a liquid state. In this case, the boosting pump 31 may slightly increase the pressure and the temperature of the liquefied gas by pressurizing the liquefied gas discharged from the liquefied gas storing tank 10, and the liquefied gas pressurized by the boosting pump 31 may still be in a liquid state.

The high pressure pump 32 pressurizes the liquefied gas discharged from the boosting pump 31 at a high pressure, so that the liquefied gas is supplied to the source of demand 20. The liquefied gas is discharged from the liquefied gas storing tank 10 at a pressure of approximately 10 bars, and then is primarily pressurized by the boosting pump 31, and the high pressure pump 32 secondarily pressurizes the liquid-state liquefied gas pressurized by the boosting pump 31 to supply the pressurized liquefied gas to the heat exchanger 50 to be described below.

In this case, the high pressure pump 32 pressurizes the liquefied gas to a pressure demanded by the source of demand 20, for example, 200 bars to 400 bars, to supply the pressurized liquefied gas to the source of demand 20, thereby enabling the source of demand 20 to generate power through the liquefied gas.

The high pressure pump 32 pressurizes the liquid-state liquefied gas, discharged from the boosting pump 31, to a high pressure and may phase-change the liquefied gas to be in a supercritical state having a higher temperature and pressure than a critical point. In this case, the temperature of the liquefied gas, which is in the supercritical state, may be equal to or lower than −20° C., which is relatively higher than a critical temperature.

Otherwise, the high pressure pump 32 pressurizes the liquid-state liquefied gas with a high pressure to change the liquid-state liquefied gas to be in a supercooled liquid state. Here, the supercooled liquid state of the liquefied gas means a state in which the pressure of the liquefied gas is higher than a critical pressure, and the temperature of the liquefied gas is lower than the critical temperature.

Specifically, the high pressure pump 32 pressurizes the liquid-state liquefied gas discharged from the boosting pump 31 with a high pressure to 200 bars to 400 bars, in such a manner that the temperature of the liquefied gas is lower than the critical temperature, thereby phase-changing the liquefied gas to be in the supercooled liquid state. Here, the temperature of the liquefied gas in the supercooled liquid state may be −140° C. to −60° C., which is relatively lower than the critical temperature.

However, the high pressure pump 32 may be omitted when the source of demand 20 is a low pressure engine. In other words, when the source of demand 20 is a dual fuel engine, which is a low pressure engine, the liquefied gas may be pressurized by the boosting pump 31, and may then be supplied to the source of demand 20 through the heat exchanger 50 to be described below.

The heat exchanger 50 is provided on the liquefied gas supply line 21 between the source of demand 20 and the pump 30 and exchanges heat between the liquefied gas supplied from the pump 30 and the heat transfer media and supplies the heat-exchanged liquefied gas to the source of demand 20. The pump 30 for supplying the liquefied gas to the heat exchanger 50 may be the high pressure pump 32. The heat exchanger 50 may heat the liquefied gas in the supercooled liquid state or the supercritical state while maintaining 200 bars to 400 bars, which are pressures discharged from the high pressure pump 32, convert the liquefied gas into the liquefied gas in the supercritical state at 30° C. to 60° C., and then supply the converted liquefied gas to the source of demand 20.

In the embodiment, the heat exchanger 50 may heat the liquefied gas by using the heat transfer media supplied from the media heater 63 to be described below. In this case, the heat transfer media may be glycol water, and the glycol water is a fluid in which ethylene glycol is mixed with water, and may be heated by the media heater 63, cooled by the heat exchanger 50, and circulated along a media circulation line 64.

A temperature of the heat transfer media, which is heat-exchanged with the liquefied gas in the heat exchanger 50 and then discharged, may be changed according to the aforementioned phase change of the liquefied gas of the high pressure pump 32. In other words, when the high pressure pump 32 phase changes the liquefied gas to be in the supercooled liquid state and then supplies the phase changed liquefied gas to the heat exchanger 50, the heat transfer media may be cooled while heating the supercooled liquid state liquefied gas to 30° C. to 60° C., or when the high pressure pump 32 phase changes the liquefied gas to be in the supercritical state and then supplies the phase changed liquefied gas to the heat exchanger 50, the heat transfer media may be cooled while heating the supercritical state liquefied gas, which has a higher temperature than that of the supercooled liquid state, to a demanded temperature of the source of demand 20. In this case, the heat transfer media in a case of being heat exchanged with the supercooled liquid state liquefied gas may be cooled to a lower temperature than that of the heat transfer media in a case of being heat exchanged with the supercritical state liquefied gas and then circulated into a media tank 61.

However, a temperature or a flow rate of the heat transfer media supplied to the heat exchanger 50 may be changed through the controller 90 to be described below according to a flow rate, a temperature, and the like of the liquefied gas measured at a front end of the heat exchanger 50.

In other words, in the present embodiment, a degree of heating the liquefied gas is not changed according to the temperature of the liquefied gas at a rear end of the heat exchanger 50, but calories to be supplied to the liquefied gas are changed according to a state of the liquefied gas at the front end of the heat exchanger 50, so that the liquefied gas appropriate for a temperature demanded by the source of demand 20 may always be supplied to the source of demand 20 at a downstream of the heat exchanger 50. The feed forward control will be described below.

The media supply device 60 supplies the heat transfer media to the heat exchanger 50. The media supply device 60 includes a media tank 61, a media pump 62, a media heater 63, a media circulation line 64, a branch line 65, and a heat source supply line 66.

The media tank 61 stores the heat transfer media. The heat transfer media may be glycol water as described above, and the media tank 61 may store the heat transfer media at a temperature at which cracking (a phenomenon in which water and ethylene glycol are separated due to a phase change of water) of the glycol water may be prevented.

The media pump 62 is provided at a downstream of the media tank 61, so that the predetermined amount of heat transfer media may flow into the media heater 63 from the media tank 61 by the media pump 62. In addition, the heat exchanger 50 is connected to an upstream of the media tank 61, so that the heat transfer media, which is cooled after supplying heat to the liquefied gas, may flow into the media tank 61 again.

The media tank 61, the media pump 62, the media heater 63, and the heat exchanger 60 may be connected with each other by the media circulation line 64. In other words, the heat transfer media moves sequentially from the media tank 61 through the media pump 62 and the media heater 63 to the heat exchanger 50 to be heated or cooled while moving along the media circulation line 64.

The media pump 62 supplies the heat transfer media stored in the media tank 61 to the media heater 63. The media pump 62 may be provided at the downstream of the media tank 61, and the number of media pumps 62 may be plural, so that when any one of the media pumps 62 is damaged, the heat transfer media may be smoothly supplied through another media pump 62.

Driving of the media pump 62 may be controlled by the controller 90 to be described below. The media pump 62 may control a flow rate of the heat transfer media supplied to the media heater 63. A driving speed, a pressure, and the like of the media pump 62 may be changed by the controller 90, which means that a flow rate of the heat transfer media flowing into the media heater 63 is finally changed. A change in a flow rate of the heat transfer media flowing into the media heater 63 means a change in total calories of the heat transfer media discharged from the media heater 63 and flowing into the heat exchanger 50. In the embodiment, the heat exchanger 50 may control the calories supplied to the liquefied gas by the heat transfer media by changing the flow rate.

The media heater 63 heats the heat transfer media discharged from the media tank 61 and then supplies the heated heat transfer media to the heat exchanger 50. The media heater 63 heats the heat transfer media at a predetermined temperature, so that the heat transfer media may supply sufficient heat to the liquefied gas in the heat exchanger 50 to.

The media heater 63 may heat the heat transfer media by using electrical energy, but may use steam in the present embodiment. In other words, the heat source supply line 66 for supplying a heat source is connected to the media heater 63, and the heat source supply line 66 supplies steam generated by a boiler (not shown) to the media heater 63. The steam supplies heat to the heat transfer media, and the heat transfer media cool the steam, so that the heat transfer media may be heated, and the steam may be condensed to condensed water.

In this case, the condensed water may flow into the boiler again through a condensed water tank (not shown), be changed to steam, and then flow into the media heater 63 again. The heat transfer media heated by the steam may be discharged from the media heater 63 to flow into the heat exchanger 50.

The media circulation line 64 is connected from the media heater 63 to the heat exchanger 50 to circulate the heat transfer media. The heat transfer media may be heated in the media heater 63 while being circulated along the media circulation line 64, and may be cooled by the liquefied gas in the heat exchanger 50.

In addition, the media circulation line 64 connects the media tank 61, the media pump 62, the media heater 63, and the heat exchanger 50 so as to cause the heat transfer media to be circulated. Accordingly, in the present embodiment, the heat transfer media is re-used, thereby improving efficiency.

The present embodiment may include a media discharge line (not shown) for discharging some of the heat transfer media discharged from the heat exchanger 50 to the outside, and the media discharge line may be branched from the media circulation line 64.

The branch line 65 causes at least some of the heat transfer media to be branched from the media circulation line and bypass the media heater 63. The branch line 65 may be branched at an upstream point of the media heater 63 on the media circulation line 64 and be joined at a downstream point of the media heater 63.

The heat transfer media, bypassing the media heater 63 through the branch line 65, and the heat transfer media, flowing into the media heater 63 through the media circulation line 64 without flowing into the branch line 65, may be joined at the downstream of the media heater 63. In this case, the temperature of the heat transfer media bypassing the media heater 63 may be lower than the temperature of the heat transfer media heated by the media heater 63.

In this case, when a flow rate of the heat transfer media bypassing the media heater 63 is adjusted, the temperature of the heat transfer media flowing into the heat exchanger 50 may be effectively controlled. In other words, in the present embodiment, some of the heat transfer media bypasses the media heater 63 and is then joined, so that the temperature of the heat transfer media may be changed.

The branch line 65 may include a bypass adjusting valve 651. A degree of opening of the bypass adjusting valve 651 is controlled by the controller 90 to be described below, thereby adjusting a flow rate of the heat transfer media flowing into the branch line 65. The bypass adjusting valve 651 may be a bidirectional valve provided on the branch line 65.

The heat source supply line 66 supplies a heat source to the media heater 63. In this case, the heat source, which heats the heat transfer media and causes the heated heat transfer media to heat the liquefied gas, may be steam. In other words, the heat source supply line 66 may be a steam supply line. A heat source supply valve 661 may be provided on the heat source supply line 66.

The heat source supply valve 661 may adjust a degree of opening of the heat source supply line 66, and the amount of steam flowing along the heat source supply line 66 is controlled by the heat source supply valve 661, and a temperature of the discharged heat transfer media heated by the media heater 63 may be changed. The heat source supply valve 661 may be controlled by the controller 90.

The liquefied gas temperature sensor 70 is provided on the liquefied gas supply line 21 and measures a temperature of the liquefied gas. The liquefied gas temperature sensor 70 may be provided between the pump 30 and the heat exchanger 50 on the liquefied gas supply line 21 and may measure a temperature of the liquefied gas pressurized by the high pressure pump 32.

The liquefied gas is heated by the heat exchanger 50 and supplied to the source of demand 20, so that when the temperature of the liquefied gas is measured at the front end of the heat exchanger 50, it is possible to find out a required degree of heating the liquefied gas in order to meet a demanded temperature of the source of demand 20. In other words, in the present embodiment, a degree of heating by the heat exchanger 50 is not controlled by the temperature of the liquefied gas heated by the heat exchanger 50, but calories of the heat transfer media to be supplied to the heat exchanger 50 may be controlled by a temperature of the liquefied gas to flow into the heat exchanger 50. This is referred to as feed forward control.

The calorie calculator 80 calculates a flow rate of the liquefied gas supplied to the heat exchanger 50 on the basis of a driving degree of the pump 30, and calculates necessary calories of the heat transfer media based on the flow rate of the liquefied gas and a state of the liquefied gas demanded by the source of demand 20. In this case, the driving degree of the pump 30 means RPM of the pump 30, and the pump 30 may be the high pressure pump 32 which is a positive displacement pump 30.

The calorie calculator 80 may calculate necessary calories of the heat transfer media by using the flow rate of the liquefied gas, the temperature of the liquefied gas measured by the liquefied gas temperature sensor 70, and the temperature of the liquefied gas demanded by the source of demand 20.

The calorie calculator 80 is configured to calculate total calories to be received from the heat exchanger 50 so that the liquefied gas is properly supplied to the source of demand 20. The calorie calculator 80 may find out a flow rate and a temperature of the liquefied gas before flowing into the heat exchanger 50 and calculate calories, which are necessary for the liquefied gas to reach the temperature demanded by the source of demand 20, as necessary calories of the heat transfer media.

In the present embodiment, unlike the liquefied gas treatment system 1 in the related art, it is possible to calculate the calories, which the heat transfer media to be put into the heat exchanger 50 need to include, by using the flow rate and the temperature of the liquefied gas flowing into the heat exchanger 50. The controller 90 to be described below may receive the necessary calories of the heat transfer media from the calorie calculator 80 and adjust the flow rate of the heat transfer media flowing into the media heater 63 or the amount of heat sources supplied to the media heater 63. In the present embodiment, the temperature of the liquefied gas may effectively reach the demanded temperature of the source of demand 20 through the feed forward control, thereby considerably improving efficiency of the system.

The controller 90 receives the necessary calories of the heat transfer media from the calorie calculator 80 to change the flow rate of the heat transfer media flowing in to the media heater 63 or the calories supplied to the heat transfer media by the media heater 63. The controller 90 may change the flow rate of the heat transfer media and the like based on the flow rate of the liquefied gas flowing into the heat exchanger 50.

Specifically, the controller 90 may control the flow rate of the heat transfer media supplied to the media heater 63 from the media pump 62 by controlling the driving of the media pump 62, or may adjust the flow rate of the heat transfer media flowing into the branch line 65 through the bypass adjusting valve 651 provided on the branch line 65.

In addition, the controller 90 may control the amount of heat sources supplied to the heat transfer media by the media heater 63 through the adjustment of the degree of opening of the heat source supply valve 661 provided in the heat source supply line 66, thereby changing a heating temperature of the heat transfer media.

In addition, the controller 90 may return at least some of the heat transfer media, flowing from the media pump 62 to the media heater 63, to the media tank 61 or the media pump 62, thereby changing the amount of the heat transfer media into the media heater 63. The controller 90 in the present embodiment is not limited to the aforementioned contents, and if the flow rate of the heat transfer media supplied to the media heater 63 can be changed, any control is allowed.

As described above, in the present embodiment, the flow rate, the temperature, and the like of the liquefied gas supplied from the liquefied gas storing tank 10 are measured at the front end of the heat exchanger 50, the calories, by which the liquefied gas needs to receive from the heat exchanger 50 considering the temperature of the liquefied gas demanded by the source of demand 20, are calculated as the necessary calories of the heat transfer media. The amount of heat transfer media, flowing into the media heater 63, or the amount of heat sources, supplied to the heat transfer media from the media heater 63, is adjusted according to the calculated necessary calories of the heat transfer media, thereby effectively heating the liquefied gas.

FIG. 3 is a flowchart of a liquefied gas treatment method according to an embodiment of the present invention. The liquefied gas treatment method according to the embodiment of the present invention may be a method of implementing the liquefied gas treatment system 2 according to the embodiment of the present invention, and hereinafter, each step will be described in detail with reference to FIG. 3.

As illustrated in FIG. 3, the liquefied gas treatment method according to the embodiment of the present invention includes calculating a flow rate of liquefied gas supplied to the heat exchanger 50 (S10), measuring temperature of the liquefied gas (S20), calculating necessary calories of heat transfer media to be supplied to the heat exchanger 50 based on the flow rate of the liquefied gas, the temperature of the liquefied gas, and a state of the liquefied gas demanded by the source of demand 20 (S30), and changing the flow rate of the heat transfer media flowing into the media heater 63 or calories supplied to the heat transfer media by the media heater 63 according to the necessary calories of the heat transfer media (S40).

In step S10, the flow rate of the liquefied gas supplied to the heat exchanger 50 is calculated. The flow rate of the liquefied gas may be calculated on the basis of a driving degree of the pump 30, and in this case, the driving degree of the pump 30 means RPM, and the pump 30 may be the positive displacement pump 30 capable of detecting a flow rate of the liquefied gas through the RPM, and the high pressure pump 32.

When the flow rate of the liquefied gas is calculated through the RPM of the pump 30, it is possible to find out the amount of heat, which the liquefied gas needs to receive from the heat exchanger 50 in order to be heated to the demanded temperature of the source of demand 20. To this end, a temperature of the liquefied gas is necessary, and the temperature of the liquefied gas is measured in step S20.

In step S20, the temperature of the liquefied gas is measured. The temperature of the liquefied gas means a temperature before being heated, and the liquefied gas temperature sensor 70 may measure a temperature of the liquefied gas between the pump 30 and the heat exchanger 50 in step S20.

The flow rate and the temperature of the liquefied gas flowing into the heat exchanger 50 is found out through steps S10 and S20. When the temperature of the liquefied gas required by the source of demand 20 is calculated, it is possible to calculate calories, which the liquefied gas needs to receive, based on the current calories of the liquefied gas. The calories, which the liquefied gas needs to receive, mean calories to be supplied to the liquefied gas by the heat exchanger 50, that is, necessary calories of the heat transfer media. As described above, in the present embodiment, the feed forward control is implemented based on the flow rate and the temperature of the liquefied gas at the front end of the heat exchanger 50, thereby efficiently heating the liquefied gas.

In step S30, the necessary calories of the heat transfer media to be supplied to the heat exchanger 50 are calculated based on the flow rate of the liquefied gas, the temperature of the liquefied gas, and the state of the liquefied gas demanded by the source of demand 20. Step S30 may be implemented by the aforementioned calorie calculator 80, and the calorie calculator 80 may find out the flow rate of the liquefied gas through the RPM of the pump 30, find out the temperature of the liquefied gas through the liquefied gas temperature sensor 70, and calculate the current calories of the liquefied gas to flow into the heat exchanger 50.

In addition, the calorie calculator 80 may calculate the amount of change in the temperature of the liquefied gas through the temperature of the liquefied gas demanded by the source of demand 20, and accurately calculate the calories to be supplied to the liquefied gas by using a calorie calculation formula. The calories calculated as described above are the necessary calories of the heat transfer media and are target calories which the heat transfer media are heated in the media heater 63 to reach.

In step S40, the flow rate of the heat transfer media flowing into the media heater 63 or the calories supplied to the heat transfer media by the media heater 63 are changed according to the necessary calories of the heat transfer media. The necessary calories of the heat transfer media are obtained through the calories which the liquefied gas needs to receive, and are supplied through the media heater 63. Accordingly, the necessary calories of the heat transfer media may be changed according to the flow rate of the heat transfer media flowing into the media heater 63, or according to the amount of heat sources (steam, and the like) transferred to the heat transfer media from the media heater 63.

In the present embodiment, step S30 may be omitted, and the flow rate and the like of the heat transfer media may be changed according to the flow rate of the liquefied gas flowing into the heat exchanger 50.

As described above, in the present embodiment, the calories, required by the liquefied gas in order to meet the demanded state of the source of demand 20, are calculated as the necessary calories of the heat transfer media based on the temperature and the flow rate of the liquefied gas before heating. In order for the heat transfer media to receive the necessary calories, the controller 90 may control the amount of heat transfer media flowing into the media heater 63 or the amount of heat sources supplied from the media heater 63. Step S40 will be described in detail with reference to FIG. 4.

FIG. 4 is a detailed flowchart of step S40 of the liquefied gas treatment method according to the embodiment of the present invention.

As illustrated in FIG. 4, step S40 of the liquefied gas treatment method according to the embodiment of the present invention includes causing at least some of the heat transfer media to bypass the media heater 63 in such a manner that a flow rate of the heat transfer media bypassing the media heater 63 is controlled (S41), controlling driving of the media pump 62 supplying the heat transfer media to the media heater 63 (S42), and controlling the amount of heat sources supplied to the heat transfer media flowing into the media heater 63 (S43).

In step S41, at least some of the heat transfer media bypasses the media heater 63, in such a manner that the flow rate of the heat transfer media bypassing the media heater 63 is controlled. To this end, in the present embodiment, the aforementioned branch line 65 may be used.

The heat transfer media flow into the media heater 63 through the media pump 62, and some of the heat transfer media flows to the downstream of the media heater 63 via the branch line 65 by the bypass adjusting valve 651 provided on the branch line 65. The remaining heat transfer media flow into the media heater 63 and be heated by steam and the like in the media heater 63.

In this case, as the flow rate of the heat transfer media bypassing the media heater 63 is large, the temperature of the heat transfer media detected at the downstream of the media heater 63, that is, the upstream of the heat exchanger 50, may become low. On the contrary, as the flow rate of the heat transfer media bypassing the media heater 63 is small, the temperature of the heat transfer media flowing into the heat exchanger 50 may become high. As described above, in the embodiment, the heat transfer media bypass the media heater 63, and the temperature of the heat transfer media is changed by changing the flow rate of the bypassing heat transfer media, so that the heat transfer media flowing into the heat exchanger 50 may include the necessary calories of the heat transfer media calculated in step S30.

In step S42, the driving of the media pump 62 supplying the heat transfer media to the media heater 63 is controlled. In step S41, some of the heat transfer media bypasses the media heater 63, but in step S42, a flow of the heat transfer media flowing into the media heater 63 may be changed. In other words, in the present embodiment, it is possible to change the flow rate supplied to the media heater 63 from the media pump 62 by controlling a speed or a pressure of the media pump 62, and thus similar to step S41, the heat transfer media may have the necessary calories to flow into the heat exchanger 50.

In step S43, the amount of heat sources supplied to the heat transfer media flowing into the media heater 63 is controlled. In steps S41 and S42, the flow rate of the heat transfer media flowing into the media heater 63 may be controlled, but in step S43, the amount of heat sources supplied by the media heater 63 may be controlled. In this case, the heat source may be steam, and the amount of heat sources may be adjusted by adjusting a degree of opening of the heat source supply line 66 connected to the media heater 63. The degree of opening the heat source supply line 66 may be implemented by the heat source supply valve 661 provided on the heat source supply line 66.

When the amount of heat sources is changed, the calories of the heat transfer media heated by and discharged from the media heater 63 may be changed, and thus, in the present embodiment, the heat transfer media may sufficiently heat the liquefied gas to the demanded temperature of the source of demand 20 in the heat exchanger 50.

Steps 41 to S43 may be separately operated, but the embodiment is not limited thereto, and one or more of steps S41 to S43 may be simultaneously operated. In other words, in order to meet the necessary calories of the heat transfer media, the flow rate of the heat transfer media bypassing the media heater 63 may be adjusted, and the amount of steam supplied may also be adjusted.

In the embodiment, in addition to steps S41 to S43, the calories contained in the heat transfer media when the heat transfer media flow into the heat exchanger 50 may be changed by using a method of collecting some of the heat transfer media supplied to the media heater 63 to the media tank 61 and the like.

As described above, in the present embodiment, the calories required by the liquefied gas are calculated through the flow rate and the temperature of the liquefied gas before flowing into the heat exchanger, the calculated calories are calculated as necessary calories of the heat transfer media supplying heat to the liquefied gas, and the flow rate of the heat transfer media to the media heater 63 or the amount of heat sources supplied to the heat transfer media from the media heater 63 is changed in order to meet the necessary calories of the heat transfer media, so that it is possible to effectively supply the liquefied gas through the feed forward control.

[Description of Main Reference Numerals of Drawings]

| | |
|---|---|
| 1: Liquefied gas treatment system in the related art | |
| 2: Liquefied gas treatment system of the present invention | |
| 10: Liquefied gas storing tank | 20: Source of demand |
| 21: Liquefied gas supply line | 30: Pump |
| 31: Boosting pump | 32: High pressure pump |
| 40: Electric heater | 50: Heat exchanger |
| 60: Media supply device | 61: Media tank |
| 62: Media pump | 63: Media heater |
| 64: Media circulation line | 65 : Branch line |
| 651: Bypass adjusting valve | 66: Heat source supply line |
| 661: Heat source supply valve | 70: Liquefied gas temperature sensor |
| 80: Calorie calculator | 90: Controller |

The invention claimed is:

1. A liquefied gas treatment system, comprising:
a liquefied gas supply line connected from a liquefied gas storing tank to a source of demand;
a pump provided on the liquefied gas supply line and configured to pressurize liquefied gas discharged from the liquefied gas storing tank;
a heat exchanger provided on the liquefied gas supply line between the source of demand and the pump, and configured to exchange heat between the liquefied gas supplied from the pump and heat transfer media;
a media heater configured to heat the heat transfer media;
a media circulation line connected from the media heater to the heat exchanger;
a calculator calculating a flow rate of the liquefied gas supplied to the heat exchanger on the basis of a driving degree of the pump;
a controller configured to change a flow rate of the heat transfer media flowing into the media heater on the basis of a flow rate of the liquefied gas supplied to the heat exchanger or calories supplied to the heat transfer media by the media heater on the basis of a flow rate of the liquefied gas supplied to the heat exchanger;
wherein the pump comprises a boosting pump and a high pressure pump, wherein the boosting pump is positioned between the liquefied gas storing tank and the high pressure pump or inside the liquefied gas storing tank; and
wherein the boosting pump pressures the liquefied gas to 1-25 bar, and the high pressure pump pressures the liquefied gas to 200-400 bar.

2. The system of claim 1, wherein the calculator is configured to calculate necessary calories of the heat transfer media on the basis of the flow rate of the liquefied gas and a state of the liquefied gas demanded by the source of demand, and
wherein the controller receives the necessary calories of the heat transfer media from the calculator and changes the flow rate of the heat transfer media flowing into the media heater or the calories supplied to the heat transfer media by the media heater.

3. The system of claim 1, wherein the driving degree of the pump is RPM of the pump.

4. The system of claim 2, further comprising;
a liquefied gas temperature sensor provided on the liquefied gas supply line and configured to measure a temperature of the liquefied gas,
wherein the calculator calculates the necessary calories of the heat transfer media by using the flow rate of the liquefied gas, the temperature of the liquefied gas, and a demanded temperature of the liquefied gas by the source of demand.

5. The system of claim 4, wherein the liquefied gas temperature sensor is provided between the pump and the heat exchanger on the liquefied gas supply line.

6. The system of claim 1, further comprising:
a branch line configured to cause at least some of the heat transfer media to be branched from the media circulation line and bypass the media heater,
wherein the controller adjusts a flow rate of the heat transfer media flowing into the branch line through a bypass adjusting valve provided on the branch line.

7. The system of claim 1, further comprising:
a media tank configured to store the heat transfer media; and
a media pump configured to supply the heat transfer media, stored in the media tank, to the media heater,
wherein the controller controls a flow rate of the heat transfer media supplied to the media heater from the media pump by controlling driving of the media pump.

8. The system of claim 1, further comprising:
a heat source supply line configured to supply a heat source to the media heater; and
a heat source supply valve provided on the heat source supply line and configured to adjust a degree of opening of the heat source supply line,
wherein the controller controls the amount of heat sources supplied to the heat transfer media by the media heater by controlling the degree of opening of the heat source supply valve.

9. The system of claim 1, wherein the heat transfer media are glycol water.

10. The system of claim 1, further comprising a media pump positioned between a media tank and the media heater and supplying the heat transfer media to the media heater.

11. The system of claim 1, wherein the liquefied gas storing tank comprises an external tank, an internal tank provided inside the external tank, and an insulation part between the external tank and the internal tank.

12. The system of claim 1, wherein the high pressure pump changes a phase of the liquefied gas from a liquid state to a supercooled liquid state, and the heat exchanger changes a phase of the liquefied gas from the supercooled liquid state to a supercritical state.

* * * * *